Nov. 16, 1948.    J. B. BAKER ET AL    2,454,028
SELF-CONTAINED ROLLER BEARING CAGE
Filed Dec. 22, 1945

INVENTORS;
John B. Baker and
Harold D. Stover,
By Carr Law Gravely,
THEIR ATTORNEYS.

Patented Nov. 16, 1948

2,454,028

UNITED STATES PATENT OFFICE 2,454,028

SELF-CONTAINED ROLLER-BEARING CAGE

John B. Baker and Harold D. Stover, Canton, Ohio, assignors to The Timken Roller Bearing Company, Canton, Ohio, a corporation of Ohio Application December 22, 1945, Serial No. 636,960

3 Claims. (Cl. 301—235)

This invention relates to rotary antifriction bearings, particularly roller thrust bearings of the kind including an annular series of antifriction rollers and a flat annular retaining cage therefor. The invention has for its principal object to make a self-contained unit of the cage and antifriction rollers and thereby facilitate assembling of the bearing. The invention consists in the self-contained roller bearing cage and roller unit and in the process of making said unit.

Figure 1:
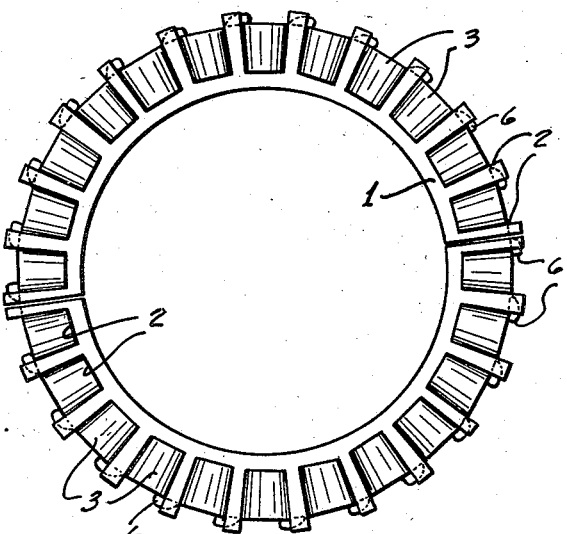
Figure 2:
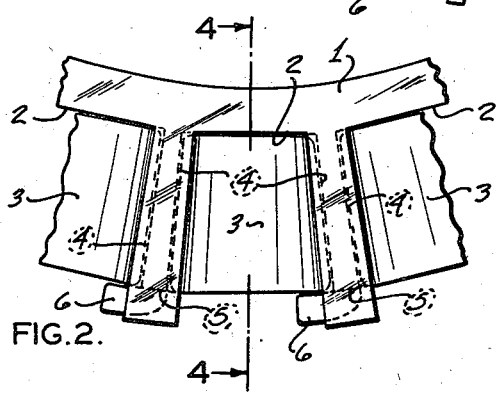
Figure 5:
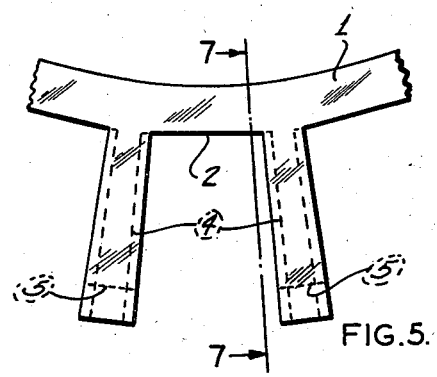
Figure 3:
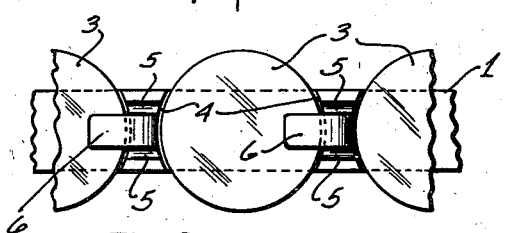
Figure 6:
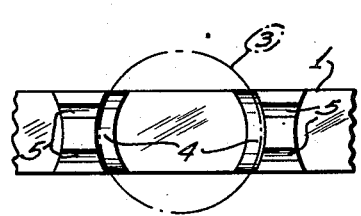
Figure 4:
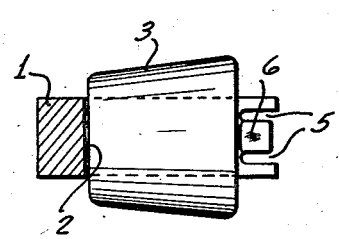
Figure 7:
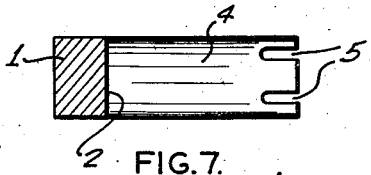

In the accompanying drawing, which forms part of this specification and wherein like symbols refer to like parts wherever they occur, Fig. 1 is an end elevational view of a self-contained roller bearing cage and roller unit embodying my invention, Fig. 2 is an enlarged fragmentary end elevational view of said cage and roller unit, Fig. 3 is an edge view of the portion of the unit shown in Fig. 2, Fig. 4 is a sectional view on the line 4—4 in Fig. 2, Fig. 5 is a fragmentary end elevational view of the cage before the outer peripheral portions thereof are bent into roller retaining position, Fig. 6 is an edge elevational view of the portion of the cage shown in Fig. 5; and Fig. 7 is a sectional view on the line 7—7 in Fig. 5.

The cage and roller assembly shown in the accompanying drawing comprises a flat annular cage 1 having an annular series of circumferentially spaced positioning and retaining pockets 2 therein that extend radially inwardly from the outer peripheral edge of said cage and terminate short of the inner peripheral edge thereof and have antifriction rollers 3 positioned therein. As shown in the drawing, the roller containing pockets 2 and the rollers 3 therein taper toward the rotary axis of the cage, and the longitudinal sides of said pockets are formed with longitudinally concave surfaces 4 that embrace the adjacent sides of said rollers and prevent removal of the rollers from said pockets in a direction lengthwise of the rotary axis of said cage. The rollers 3 are inserted in the pockets 2 from the open outer ends thereof.

According to the present invention, the cage 1 is made from a flat annular plate having two axially spaced grooves 5 turned in the outer peripheral edge thereof. The annular cage plate is milled in from the outer peripheral edge thereof to form the pockets 2 and the longitudinally concave side faces 4 thereof. For convenience in mounting and dismounting, the annular cage plate 1 may be split radially into segments. The portions of the two outer peripheral grooves 5 that remain after the pockets 2 are milled in the cage plate 1 form countersunk outer peripheral ribs or tongues 6 between the pockets 2 at the outer ends thereof midway between the top and bottom faces of said cage plate. In assembling the roller bearing cage and roller unit, the rollers 3 are slipped into the pockets 2 through the open outer ends thereof, and the peripheral ribs or tongues 6 between the outer ends of said pockets are bent to one side into the pockets 2 and over the outer ends of the rollers 3 therein so as to partially close said pockets and thereby prevent endwise removal of the rollers therefrom.

The hereinbefore described process makes a simple and economical self-contained unit of the cage and the antifriction rollers, thereby facilitating assembling of the bearing. The cage is made from a simple flat annular plate with the roller pockets milled in from the outer periphery thereof and the side faces of the bridges grooved to conform to the curved surfaces of the rollers. The locking tongues at the outer peripheral edge of the cage may be quickly and easily bent into the pockets to partially close the outer ends thereof and thus retain the rollers therein; and said tongues are indented or sunk into the outer edge of said cage between the top and bottom surfaces so that said surfaces are not disturbed and the full thickness of the cage is maintained beyond the outer ends of the rollers where the cage rides on the thrust ribs of the raceway members (not shown) of the roller thrust bearing.

What we claim is:

1. A self-contained roller bearing cage and a roller unit comprising an annular cage member with an annular series of pockets leading inwardly from the outer peripheral edge of said cage member, and rollers positioned in said pockets with their outer ends terminating short of the outer ends thereof, said annular cage member having preformed tongues in the outer peripheral edge thereof that are bent into said pockets and across the outer ends of said rollers in the plane of the rotary axes thereof.

2. A self-contained roller bearing cage and a roller unit comprising an annular cage member with an annular series of pockets leading inwardly from the outer peripheral edge of said cage member, and rollers positioned in said pockets with their outer ends terminating short of the outer ends thereof, said annular cage member having two circumferential grooves in the outer peripheral edge thereof forming tongues therebetween that are bent into said pockets from one side thereof and across the outer ends of said rollers.

3. A self-contained roller bearing cage and a roller unit comprising an annular cage member with an annular series of pockets leading inwardly from the outer peripheral edge of said cage member, and rollers positioned in said pockets with their outer ends terminating short of the outer ends thereof, said cage member having preformed tongues at the outer peripheral edge thereof that are bent circumferentially of said edge and extend partway into said pockets and partway across the outer ends of said rollers in the plane of the rotary axes thereof from one side of said pockets, said annular cage member being divided into segments.

JOHN B. BAKER.
HAROLD D. STOVER.

REFERENCES CITED

The following references are of record in the file of this patent:

UNITED STATES PATENTS

| Number | Name | Date |
| --- | --- | --- |
| 670,950 | Eveland | Apr. 2, 1901 |
| 1,915,288 | Bott | June 27, 1933 |
| 2,173,508 | Horrocks | Sept. 19, 1939 |
| 2,330,741 | Potter | Sept. 28, 1943 |

FOREIGN PATENTS

| Number | Country | Date |
| --- | --- | --- |
| 410,891 | Great Britain | May 31, 1934 |